Figure 1:
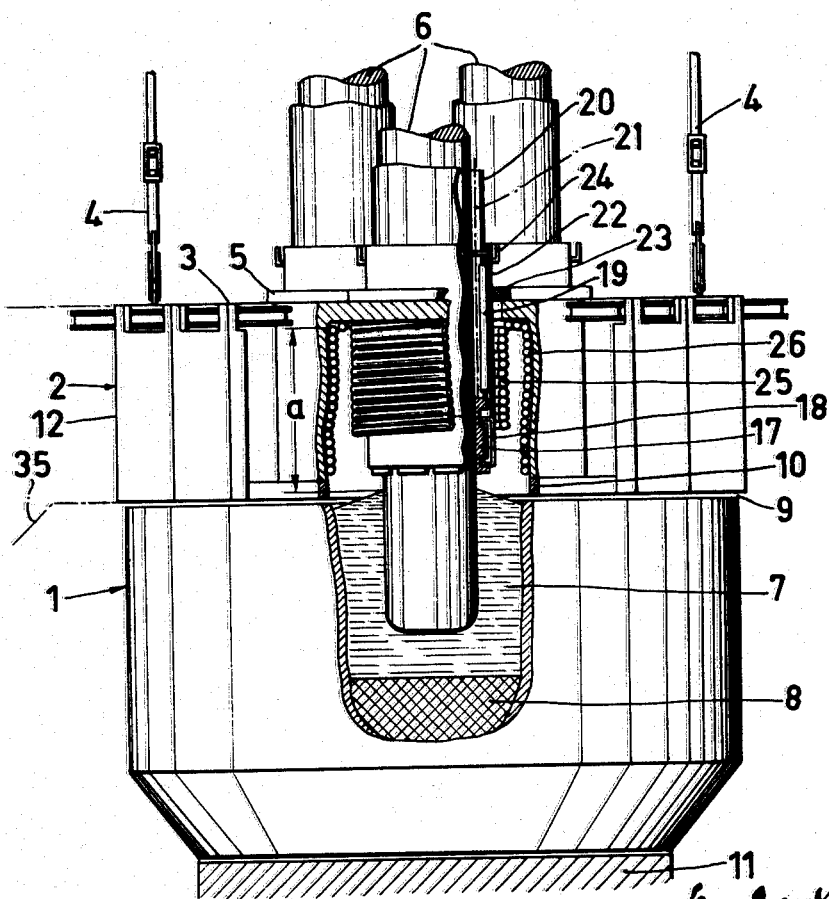

April 14, 1964 S. E. LINDBLOM ETAL 3,129,274
REDUCTION FURNACE PROVIDED WITH SUPERSTRUCTURE
Filed March 26, 1962 5 Sheets-Sheet 1

INVENTORS
Sven Edvard Lindblom
Stig Harald Tjernstrom
Karl Hugo Sture Hellman
By
Attorney April 14, 1964  S. E. LINDBLOM ETAL  3,129,274
REDUCTION FURNACE PROVIDED WITH SUPERSTRUCTURE
Filed March 26, 1962  5 Sheets-Sheet 5

Inventors
Sven Edvard Lindblom
Stig Harald Tjernstrom
Karl Hugo Sture Hellman 3,129,274
REDUCTION FURNACE PROVIDED WITH
SUPERSTRUCTURE
Sven Edvard Lindblom, Trollhattan, and Stig Harald Tjernström and Karl Hugo Sture Hellman, Vargon, Sweden, assignors to Wargons Aktiebolag, Vargon, Sweden, and AB Svenska Maskinverken, Kallhall, Sweden, Swedish joint-stock companies
Filed Mar. 26, 1962, Ser. No. 182,233
Claims priority, application Sweden Mar. 29, 1961
5 Claims. (Cl. 13—9)

This invention relates to a reduction furnace provided with superstructure and intended for high reaction temperatures, especially for the production of ferro-alloys and calcium carbide by reduction of oxidic materials with coal and/or coke, and which furnace has electrodes extending through the ceiling of the superstructure and down into the charge.

In the reduction of oxidic ores with coal for the production of pig iron, calcium carbide, ferro-manganese, silicon metal, silicon iron and ferro-alloys in general there are required such high reaction temperatures that the carbon contained in the charge substantially leaves in the form of carbon monoxide.

In open furnaces the carbon monoxide is allowed to burn to carbon dioxide over the charge surface of the furnace without its heat being utilized, so that great quantities of heat are wasted. Thus, the below mentioned heat balance obtained in an open 12,000 kva. reduction furnace in the production of 45% silicon iron shows that the heat and energy contents of the furnace gases are of approximately the same order of magnitude as the supplied electric energy and that the heat efficiency of the furnace is only about 50% when the heat contents of the furnace gases are not recovered.

| Supplied heat quantity: | Percent |
|---|---|
| Electrical energy | 53.6 |
| Energy contents of the reduction agent, incl. electrode consumption | 42.5 |
| Exothermic heat of formation | 3.9 |
| | 100.0 |

| Consumed heat quantity: | |
|---|---|
| Endothermic reaction heat | 43.3 |
| Physical heat contents of the alloy | 5.6 |
| Heat losses through the furnace walls | 2.1 |
| Radiation losses through the charge | 1.6 |
| Physical heat contents of the furnace gas | 2.6 |
| Energy contents of the furnace gas | 44.7 |
| | 100.0 |

In the combustion of the furnace gases above the furnace not only are great quantities of heat lost but also an intense heat is developed which renders the attendance of the furnace difficult and severely strains all the furnace elements above the furnace.

With respect to the above statements, an attempt has been made to utilize the carbon monoxide contents of the furnace gases and also to eliminate the heat development above the furnace by preventing the combustion of the carbon monoxide. For this purpose the furnace proper has been provided with a gas-tight superstructure and the gas collected under the vault thus formed, and usually containing 70–90% of carbon monoxide, has been led away for use as fuel and/or starting material for other production. As no combustion of the carbon monoxide takes place under the vault, the latter is consequently subjected only to the influence of the physical heat contents of the furnace gases and to the heat radiation from the charge. However, such covered furnaces can, of course, only be used in processes which take place at such a low reaction temperature that the temperature under the vault does not jeopardize the strength of the vault and that sintering of the charge need not be feared, as in the production of pig iron, ferro-manganese and calcium carbide. Furthermore, the attendance of a hermetically covered furnace is rendered difficult to a great extent due to its inaccessibility, and great demands must be made on the quality of the raw materials charged because disturbances in the operation must be avoided with respect to the explosion and poisoning risks which always are at hand when working with carbon monoxide.

In the reduction processes, in the first line production of high percentage silicon iron and silicon metal where a high reaction temperature is required and also sintering and other difficulties with the charge occur, the above-mentioned hermetic covering of the furnace is thus impossible in practice, and consequently it has been necessary to resort to other expedients to solve the problems. Attempts to solve the problems have been made with furnace superstructures which have permitted complete or partial combustion of the carbon monoxide under the vault, by which the furnace has become more or less accessible to the attendants. Yet, the proposed constructions have been of such a character that the vaults have not shown the required strength and reliability of service, especially in continuous operation, to endure the extremely high temperatures caused by the combustion of the carbon monoxide and momentary sagging and blowing (i.e. eruptional bursting of the charge layer due to superatmospheric pressure prevailing under said layer) in the furnace charge. To these drawbacks must be added the great difficulties connected with discharging the flue gases because in all of the abovementioned processes great dust quantities are obtained in the flue gases by evaporation losses which greatly increase with increased reaction temperature. At the high temperatures prevailing under the vault, this dust has a great propensity for sintering and adhering to the vault as well as to the flue gas duct.

The embodiment of the vault is dependent on the fact that the supply of the charge as well as of the electric current via the electrodes must take place through the vault ceiling. According to the construction principles hitherto applied, the effort has in general been to make the superstructure as low as posible, i.e. said superstructure has the character of a cover. The main object of said construction was to reduce the ohmic losses in the electrodes as much as possible as well as reducing the risks of electrode rupture resulting in troublesome and expensive interruptions of the service, although the gain obtained thereby was offset by the greater difficulties of charging and attendance.

The invention deviates radically from the conventional construction rules as, on the contrary, it recommends a raising of the superstructure which is made possible by the special arrangement according to the invention. The reduction furnace according to the invention is characterized substantially in that the electrode holders, i.e. the contact clamps transmitting the working current to the electrodes, are placed under the ceiling of the superstructure, the free distance between the ceiling and the normal charging level, which is very often located near the upper edge of the furnace body, amounting to between 1 and 4, preferably between 1.5 and 3.0 times the electrode diameter, the vault formed by the ceiling and the side walls of the superstructure being substantially completely covered by a water- or water-steam-cooled cavity structure which extends from the vault ceiling downwards so as also to surround the electrodes.

The hitherto unsolved problems of providing a heat recovery system, which is capable of functioning in continuous operation and which is economical, for reduction processes at particularly high temperatures are solved by this arrangement as regards the furnace superstructure as well as the discharge of the flue gases.

The raising of the furnace vault provides a furnace room which is larger than hitherto, i.e. makes possible a better final combustion of unburnt gases (carbon monoxide), large charging, attendance and inspection openings in the side walls of the superstructure, which also facilitate removal of fragments of ruptured electrodes, the arrangement of a large flue gas outlet resulting in a gain of charge material and a more effective dust separation, as will be described later.

By placing the electrode holders under the ceiling of the superstructure—which enables said raising of the ceiling—instead of above the superstructure as hitherto, said holders can be placed as close to the charge surface as desired. By this the expoesd electrode length under the holders can be held at a minimum, which reduces the strain of the electrode material emanating from the dead weight, the consumption and the heat stresses of the electrodes and provides, in case of electrode rupture, short fragments which are easily removable, and also reduces to a minimum the inductive resistance of the furnace and the ohmic losses occurring between the electrode holders and the charge surface, which losses, at the high current intensities in question, can be very considerable ($RI^2$).

By cooling the inside walls of the vault and also the outer surfaces of the electrodes the vault and the electrode devices are protected against undue stresses. Furthermore, the cooling surfaces effectively, prevent dust from the hot flue gases from sintering on to the walls of the vault. The cooling in connection with the dimensioning of the furnace according to the invention makes it possible to hold such a temperature in the vault that a certain agglomeration of the extremely small dust particles can be obtained without causing the sintering etcetera that makes the attendance of the heat recovery system and the final cleaning of the flue gases difficult.

A further great advantage of the arrangement according to the invention is that such materials as mineral coal, petroleum coke and charcoal and so on can be used as reduction agents, and the heat contents in the volatile constituents of said materials can be utilized, in contrast to the earlier mentioned, completely covered furnaces for the recovery of carbon monoxide wherein there is the risk of tar and pitch formation when such reduction materials are used, which can render the removal and cleaning of gas difficult.

The invention will be described more in detail below with reference to the accompanying drawings, in which—

Figure 2:
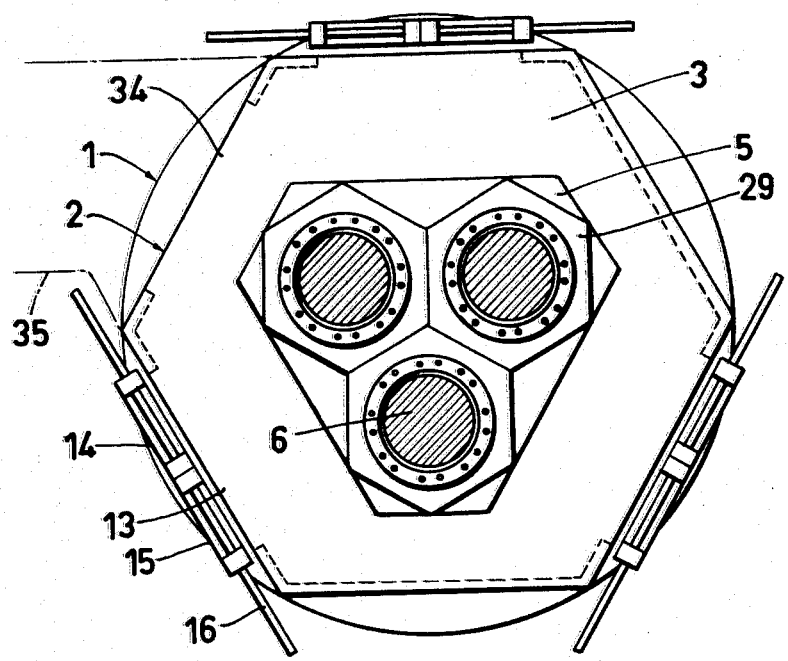
Figure 3:
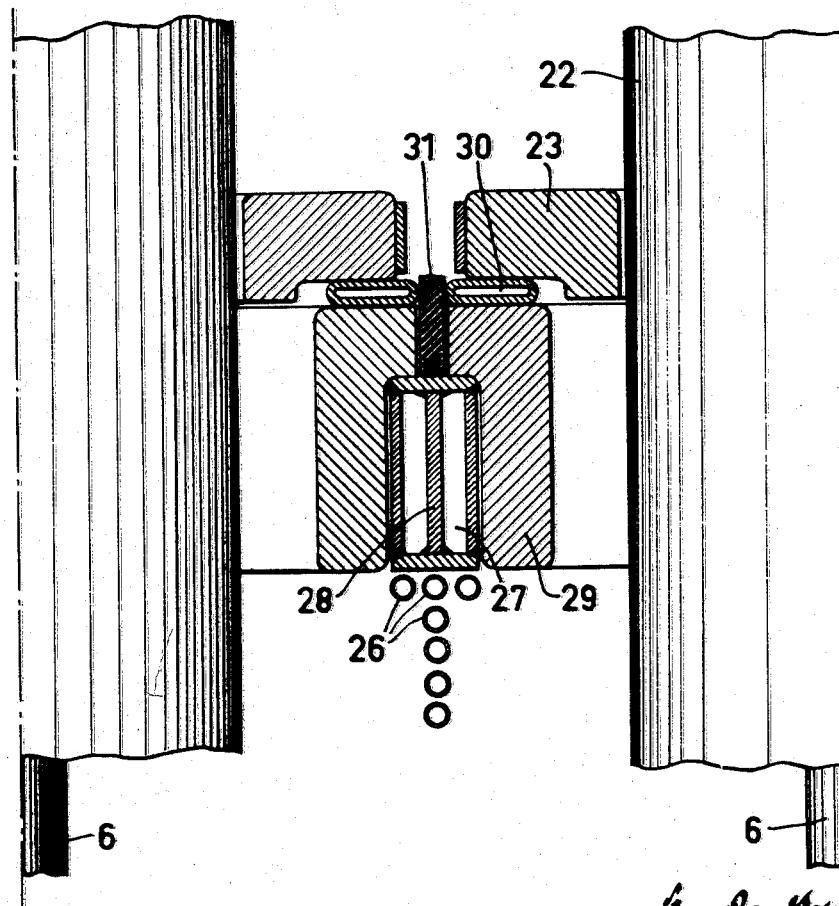
Figure 4:
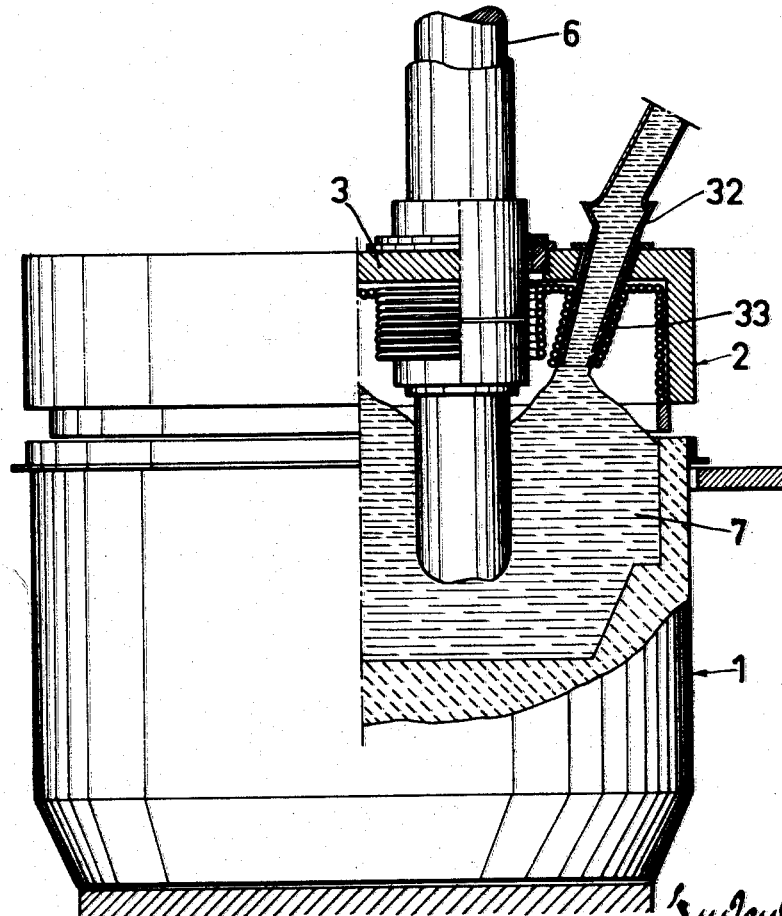
Figure 5:
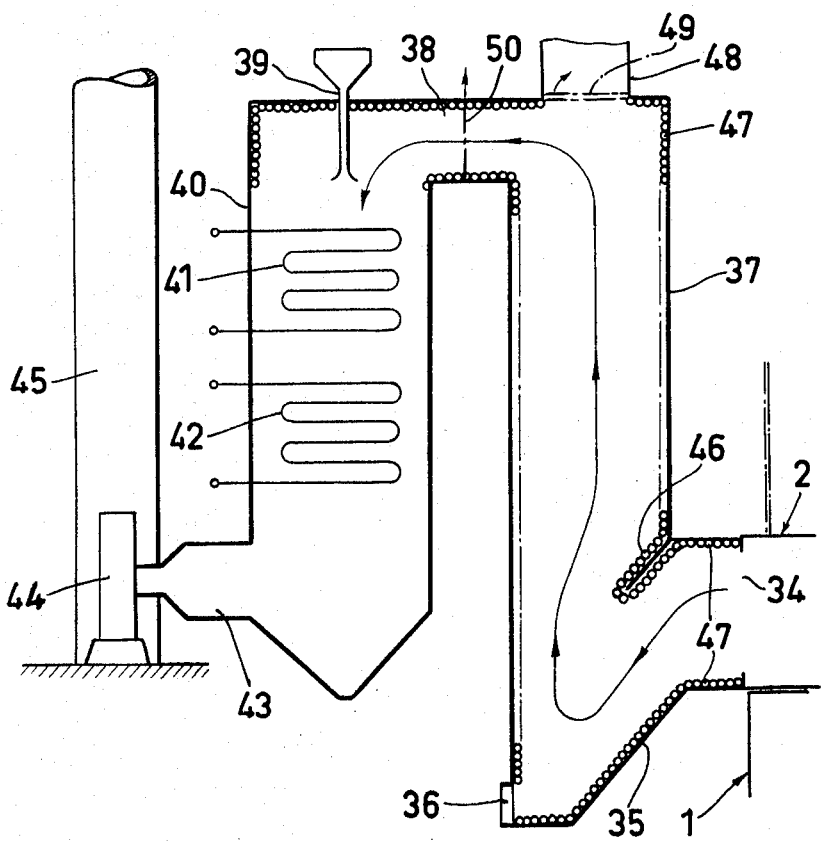

FIG. 1 is an elevation view of one embodiment of the furnace according to the invention, certain parts being cut away; FIG. 2 is a plan view of the furnace in FIG. 1; FIG. 3 is, on a larger scale, a vertical section through the electrode inlet in the vault ceiling; FIG. 4 is an elevation view, partly in section, of an alternative embodiment of the furnace with respect to its charging; and FIG. 5 is a very schematic elevation view of the exhaust gas system connected to the flue gas outlet of the furnace.

In the reduction furnace shown in FIGS. 1 and 2 which is of arc-resistance type, the furnace body proper or crucible is generally designated by 1 and the superstructure or hood by 2. In this case the superstructure 2 is freely suspended by means of insulating draw bars 4 which at which at their lower ends engage the ceiling 3 of the superstructure, the upper ends of said bars being anchored to an overlying structure not disclosed. The draw bars may be adjustable as to their length. Through the center portion 5 of the ceiling which is preferably made as a double-jacketed, low pressure water-cooled sheet metal structure, extend three symmetrically placed electrodes 6, which in the usual manner are supported and arranged for regulating the position of the electrodes in the furnace. The electrodes 6 extend down into the charge 7 consisting of the oxidic materials in question together with coal and/or coke in the furnace body 1 where the reduced smelt is shown at 8.

The furnace part or crucible 1 is separated by a space 9 from the lower edge 10 of the superstructure or hood, said edge consisting of insulating material, and is rotatably mounted (not shown) on its support 11, coaxially with the superstructure 2, so that the whole furnace body can be rotated slowly—a few revolutions or fractions of a revolution during 24 hours—by means of a suitable drive device. The object of this arrangement will become evident as the description proceeds.

As will be seen from FIG. 2, the wall of the furnace body 1 has a circular horizontal cross section, while the wall 12 of the superstructure 2 has a hexagonal horizontal cross section, every second one of the six sides being provided with an opening 13 extending over the greatest part of the side. Each such opening is adapted to be shut off by means of—in this case—two shutters 14, 15, preferably of double-jacketed, low pressure water-cooled sheet metal structure having the inside coated with refractory material, said shutters being at their upper edge slidably mounted on a horizontal supporting beam. Through said openings 13 charging, attendance and inspection of the furnace can be accomplished conveniently, owing to the ample dimensions of the openings.

Due to the limited air supply which is obtained through the adjustable space 9 between the furnace body 1 and the superstructure 2, the burning of the reduction material on the surface of the charge 7 is reduced, and furthermore a better and more regular preheating of the charge is obtained. This is due also to the rotation of the furnace body 1 relatively to the stationary electrodes 6, which results in a more distributed and consequently more uniform filling of the charge via the openings 13 and also in a facilitation of the attendance in other respects.

It will now be described in detail how the electrodes are passed through the central portion 5 of the superstructure. According to the invention the electrode holder, i.e. the contact clamps 17 providing the current transmission, is for each electrode 6 located on the underside of the top 3 of the superstructure 2. The clamps 17 are held in good contact with the electrode by means of compression ring 18 surrounding the clamps, said ring being in the case illustrated made as double-jacketed sheet metal structure, which is preferably low pressure water-cooled. The contact pressure can be obtained by diaphragms (not shown) placed in the inner wall of the compression ring, said diaphragms being pressed against the respective contact clamps 17 by low pressure water or some other liquid serving as hydraulic medium. Each clamp 17 is carried at its upper edge by a link member 19, the upper end of which is rigidly connected with the lower edge of a suspension jacket 20 which is supported at its upper end in a manner not shown. To the upper end of each contact clamp 17 are also connected one or several down leads for the electric current, preferably in the form of copper pipes, here only indicated by a dot and dash line 21. From the outer periphery of the compression ring 18 a cylindrical shield 22 extends upwards through the ceiling 3 of the superstructure while resting against a ring 23 mounted in the center portion 5 of the ceiling and consisting of ceramic or other electrically non-conductive material. Said down leads, suspension means for contact clamps 17 and compression ring 18, pipes for cooling and possibly required supply conduits for hydraulic actuation of the compression ring extend freely in the annular space formed between the electrode surface and the inside of the shield 22. Said shield which consists of nonmagnetic material, such as austenitic material, for reducing hysteresis losses, is, like the shutters 14, 15, the ceiling portion 5 and the compression ring 18, preferably made as a double-jacketed, low pressure water-cooled sheet metal structure. The pipe connections intended herefor are indicated at 24. In addition to serving as protection for conductors and pipes, the shield 22 also has for its object to prevent burning (in so-called Söderberg electrode), and combustion (in "ordinary" electrode) respectively, above the electrode holder. Furthermore, the shield provides a sealing mounting of the electrode against the inside of the ring 23. It is to be noted that an electrode with its appendant shield can, when necessary, be lifted through its ring for inspection, for which purpose the roof of the superstructure can serve as a working platform.

The shield portion below the vault is surrounded by and spaced from a coil basket 25 formed by closely located cooling pipe coils, said basket being at the top closely connected to a pipe coil system 26 which essentially completely covers the furnace vault formed by the inside of the superstructure, of course with the exception of the charge openings 13 and the flue gas outlet later described.

It is of primary importance that the center portion of the ceiling be protected against excessive heat stresses from the intense heat which can directly reach the ceiling via the space between the outside of the shield 22 and the inside of the coil basket 25, and the flue gas dust must be prevented from escaping upwards. In FIG. 3 which shows, on a larger scale, a vertical section through the most critical area inside the electrodes, suitable measures are indicated for obtaining said protection and for the sealing of the electrodes. The shield 22 of each electrode 6 is, with a rather great clearance surrounded by a first, lower pressure water-cooled annular duct 27, which has an outer wall portion 28 which is, in certain parts, common to the annular duct of the adjacent electrode. From below said duct system is protected from the heat by the pipe coils 26 of the vault ceiling and from the sides by annularly arranged blocks 29 of refractory (ceramic) material. Said ring 23 rests on the upper side of each block via a sealing, low pressure water-cooled annular duct 30. An insulation element 31 projecting from the lower annular duct 27 separates the above-lying annular ducts from each other. As is seen from the figure, the inside of the ring 23 extends close to the surface of the shield 22. The sheet metal structures of the lower cooling ducts are at their side opposite the common center of the electrodes supported (not shown) by supporting beams located at the periphery of the center portion 5. All cavity structures are preferably made of nonmagnetic material in order to avoid hysteresis losses, and this applies especially to the pipe coils in the basket 25 and on the ceiling and sides of the vault. The pipe coils are supported by hangers (not shown) which are welded on to those sides of the pipes which are protected against the direct heat radiation. The whole pipe system is high pressure water- or steam-water cooled by forced circulation, and the heat contents of the circulating water or of the water steam mixture taken up from the flue gases are utilized in the ordinary manner in heat recovery apparatus, which also may be the case in the double-jacketed sheet metal structures. Electrically non-conductive sections are inserted in the distributing tubes and headers in the high pressure as well as in the low pressure cooling system. It is pointed out in this connection that the last-mentioned arrangement, in connection with the electrically insulating suspension of the superstructure 2 and the rotation of the furnace body 1, provides a satisfactory guarantee against short-circuit between current carrying components in the charge (such as the reduction means, scrap and so on) and vital furnace parts as well as against damage to persons due to the appearance of voltage in different parts of the furnace system or in parts connected thereto.

In the embodiment disclosed the distance $a$ between the normal charge level and the inside of the ceiling (vault) of the superstructure 2 amounts approximately to twice the electrode diameter, i.e. within the values 1.5–3 times the electrode diameter mentioned as preferred in the opening paragraphs of the description.

In FIG. 4 there is shown an alternative charge arrangement. Shafts or chutes 32 here extend through the ceiling 3 of the furnace superstructure and those parts of the chutes, and wear plates respectively, which extend down into the vault room are surrounded by high pressure water-cooled pipe coils 33.

As earlier mentioned, the great distance, made possible by the invention, between charge surface and vault ceiling contributes to a very great extent to the solution of the flue gas problem because the opening of the flue gas outlet can be made very large. Heretofore it has been necessary, due to the low superstructure height, to have small (low) outlet openings, which in turn have necessitated high outflow velocities of the flue gases, in order to reduce the dust deposit in the vault. However, the high gas velocities involve great drawbacks. Thus, valuable material is wasted because particles in the charge are entrained by the gas current and dust tends to accumulate in the furnace below the vault. Especially at the high temperatures occurring in processes of this kind the dust gets a strong tendency towards sintering and agglomeration, which in the ordinary furnace and flue gas systems can more or less obstruct superstructure, flue gas ducts and waste heat boiler. It is to be particularly noted that even small adherences of dust to the convection surfaces can completely ruin the heat transfer.

As already mentioned, there is in the furnace construction according to the invention in consequence of the effective cooling of the inside of the vault no risk, worth mentioning, of deposit of dust on the vault surfaces, and therefore it is not necessary to have the high outflow velocity of the flues gases heretofore used. On the contrary, the gas velocity is reduced to a great extent, in order to obtain the effective dust separation described below. This is made possible by the rather great height according to the invention of the superstructure, which admits of an exceptionally large opening for the flue gas outlet, which is indicated at 34 in FIG. 2.

In FIG. 5 the flue gas arrangement according to the invention is shown diagrammatically. To the flue gas outlet opening 34 is connected a dust pocket 35 (also indicated in dash and dot lines in FIGS. 1 and 2), with a dust outlet 36 at its lowermost point. The pocket 35 forms an inclined bottom of a vertical cooling drum 37, the top of which is connected via a transverse duct 38, to the upper part of a per se known vertical waste heat boiler 40 shot-cleaned in the downstream direction (the shot-cleaning device is indicated at 39) with convection surfaces schematically indicated as pipe coils 41, 42. The boiler 40 communicates in its lower part via a duct 43 with the intake to a fan 44 in the lower part of a chimney 45.

Connected to the upper edge of the outlet opening 34 is a nose or guide plate 46 which projects in a direction substantially parallel with the inclined bottom of the pocket 35 (drum 37). All sides of the pocket 35, the vertical cooling drum 37 and the transverse duct 38 on to and over the waste heat boiler 40 are completely lined with high pressure water-cooled pipes 47 which may be included in the same circulation system as the pipe coils arranged in the furnace vault. In the top of the drum 37 there is provided a valve 49 adapted to be opened towards a chimney 48, and a sliding valve 50 is also provided in the transverse duct 38. During undisturbed operation the valve 49 is naturally held closed and the valve 50 open. When the waste heat boiler is to be inspected and possibly also when the system is started, the valve 50 is closed and the valve 49 is opened to let out the flue gases direct through the chimney 48.

The described flue gas arrangement operates in the following manner. The fan 44 is adjusted so as to impart to the dust containing flue gases (temperature of the magnitude of 1000° C.) flowing out from the outlet opening 34 of the furnace such a low velocity that a great part of the dust is deposited in the dust pocket 35. As is seen from the gas path indicated by arrows, the inclined guide plate 46 contributes to a great extent to this separation effect because to the dust particles is imparted a downwards directed energy of motion component as well as the addition of centrifugal force due to the immediately subsequent deflection of the flow upwards. In addition to causing the centrifugal force to act upon the dust particles as much as possible, the object of the cooling drum 37 is to cool the flue gases so much that the risk of a sintering together of the remaining dust will be exceedingly small when the gases enter the waste heat boiler 40. Dust depositing on the walls of the drum 37 will under the influence of gravity fall down to the bottom as soon as the accumulations have become large enough, and therefore the drum is self-cleaning.

After the flue gases have passed the shot-cleaned waste heat boiler 40 and thereby delivered the greatest part of its heat contents to the pipe coils 41, 42 for further transport to heating apparatus, the gases (the temperature of which is now of the magnitude of some hundreds of degrees centigrade) flow out through the chimney 45, and are free from dust to a great extent, which highly facilitates a complete dust separation of the waste gases in gas cleaning devices.

The vertical drum 37 may also be arranged to serve as a combustion chamber for oil burners for additional firing or the like.

From the above it will be seen that the furnace and the flue gas system associated therewith together constitute a system which is extraordinarily well adapted especially for the production of high percentage silicon iron and silicon metal by reduction by means of coal and/or coke during continuous drive and with good utilization of the heat quantities developed, obtaining at the same time a great reliability of service and eliminating to a great extent the risk of damage to attending persons and solving the dust problem in a satisfactory manner.

The invention is not limited to the embodiments shown, but various modifications are possible within the frame of the invention. Particularly, the various details or arrangements shown may be replaced by their equivalents. By way of example it may be mentioned that the superstructure, instead of being freely suspended, may rest flying (cantilever) on corresponding support constructions. The shutters in the sides of the superstructure may, instead of being displaceable in the lateral direction on supporting beams, be adapted to be raised and lowered by means of elevators. The furnace superstructure may, instead of having the hexagonal horizontal section shown, have another polygonal, equilateral or scalene section or be completely cylindrical, and so on. Furthermore, instead of the high pressure water-or steam-water-cooled pipe coils in furnace vault and flue gas ducts, other cooled cavity constructions could be used in case this is practically possible and suitable with respect to the temperature conditions.

Finally, the furnace with associated flue gas system may of course be used for other reduction processes than those explicitly stated in the description.

What we claim is:

1. An electric reduction furnace for high temperature processing, of the type having a crucible into which electrodes extend downwardly, characterized by:
 (A) a hood for the crucible having substantial height and having
  (1) a charging inlet of substantial size, and
  (2) an outlet of substantial size through which hot gases and dust can be withdrawn from the space beneath the hood;
 (B) means suspending the hood over the crucible with the lower edge of the hood spaced above the upper edge of the crucible to provide an inlet all around the rim of the crucible through which air can be drawn into the space beneath the hood;
 (C) means for withdrawing hot gases and dust through said outlet;
 (D) cooling coils substantially covering the inside of the hood and through which fluid cooling medium can be circulated;
 (E) a plurality of electrode holders supported by the hood and projecting a substantial distance downwardly into the space therebeneath; and
 (F) cooling means through which fluid cooling medium can be circulated surrounding all of that portion of each electrode holder which is in the space beneath the hood.

2. The reduction furnace of claim 1 wherein said outlet is located at one side of the hood, further characterized by:
 (A) means defining a passage communicated with said outlet and which extends obliquely downwardly therefrom and thence abruptly upwardly so as to provide a dust pocket; and
 (B) duct means lining said passage and through which fluid cooling medium can be circulated.

3. The reduction furnace of claim 2, further characterized by a waste heat boiler into which said passage opens.

4. An electric reduction furnace suitable for processes having very high reaction temperatures, of the type having a crucible into which electrodes project downwardly, characterized by:
 (A) means over the crucible defining a substantially large combustion chamber in which combustible gases given off from the contents of the crucible can be burned, said means comprising a hood having side walls of substantial height and a ceiling and having an outlet of substantial size through which hot gases and dust can be withdrawn from said combustion chamber;
 (B) cooling ducts through which fluid cooling medium can be circulated lining substantially the entire inside surface of the hood;
 (C) a plurality of electrode holders supported by the ceiling of the hood and projecting a substantial distance downwardly into the space therebeneath; and
 (D) cooling means through which fluid cooling medium can be circulated surrounding all of that portion of each electrode holder which is in the space beneath the hood.

5. The electric reduction furnace of claim 4 further characterized by the fact that the distance between the ceiling of the hood and the normal charging level of the crucible is between 1 and 4 times the diameter of an electrode.

References Cited in the file of this patent

UNITED STATES PATENTS

| | | |
|---|---|---|
| 1,677,712 | Dion | July 17, 1928 |
| 2,752,410 | Olsson | June 26, 1956 |

UNITED STATES PATENT OFFICE
CERTIFICATE OF CORRECTION

Patent No. 3,129,274            April 14, 1964

Sven Edvard Lindblom et al.

It is hereby certified that error appears in the above numbered patent requiring correction and that the said Letters Patent should read as corrected below.

Column 1, line 45, for "43.3" read -- 43.4 --; column 3, line 19, for "expoesd" read -- exposed --; line 66, strike out "which at".

Signed and sealed this 8th day of September 1964.

(SEAL)
Attest:

ERNEST W. SWIDER
Attesting Officer

EDWARD J. BRENNER
Commissioner of Patents